United States Patent [19]
Mulligan

[11] Patent Number: 4,475,820
[45] Date of Patent: Oct. 9, 1984

[54] DUAL CONCENTRIC, ELECTRICALLY ISOLATED, MULTI-FUNCTION ROTATABLE FLEXIBLE SHAFT

[75] Inventor: Gerard M. Mulligan, Toms River, N.J.

[73] Assignee: Pennwalt Corporation, Philadelphia, Pa.

[21] Appl. No.: 436,092

[22] Filed: Oct. 22, 1982

[51] Int. Cl.³ .................... B01F 7/16; B01F 15/02
[52] U.S. Cl. .................... 366/142; 74/501 P; 174/21 JC; 333/261; 366/184; 366/192; 366/195; 366/294; 366/296; 464/58; 464/183
[58] Field of Search .......... 366/184, 189, 192, 193, 366/194, 195, 196, 293, 294, 295, 296, 142; 333/261; 464/173, 174, 183, 58, 181; 174/28, 21 C, 21 JC, 88 C; 74/501 P

[56] References Cited
U.S. PATENT DOCUMENTS

| 1,411,433 | 4/1922 | Higgins | 464/183 |
| 1,762,970 | 6/1930 | Fiedler | 464/174 |
| 1,960,612 | 5/1934 | Winning | 464/174 |
| 2,641,744 | 6/1953 | Packh | 174/21 JC |
| 3,107,960 | 10/1963 | Neher | 333/261 |
| 3,242,691 | 3/1966 | Robinson | 464/174 |

FOREIGN PATENT DOCUMENTS 311405 1/1918 Fed. Rep. of Germany ........ 464/58

Primary Examiner—Robert W. Jenkins

[57] ABSTRACT

Flexible shafting has an outer flexible shaft with a hollow central bore for receiving an electrically insulating flexible tube which, in turn, receives an inner flexible shaft therein. The outer and inner flexible shafts are capable of rotating independently of each other while simultaneously transmitting an electric current.

9 Claims, 6 Drawing Figures

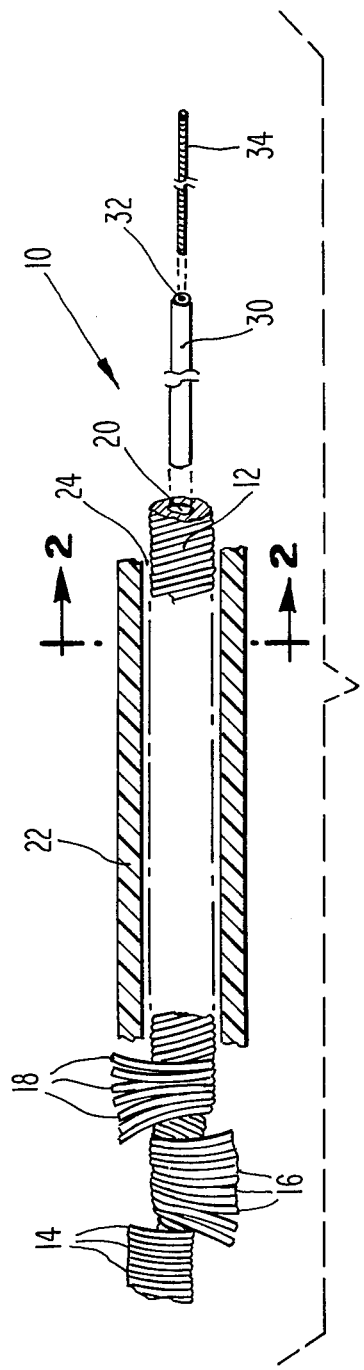
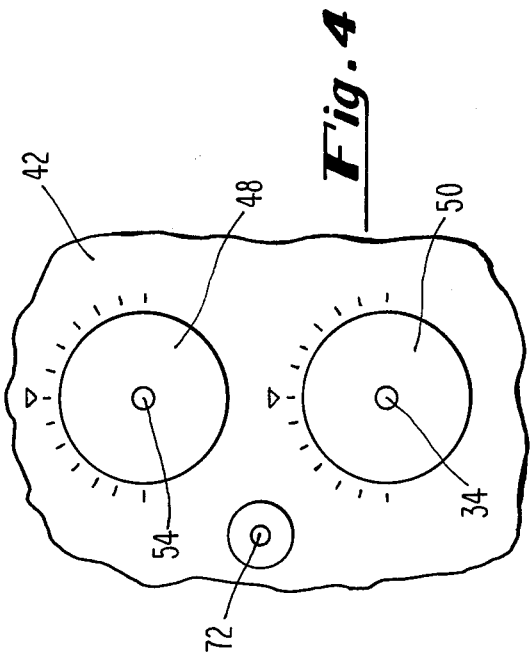
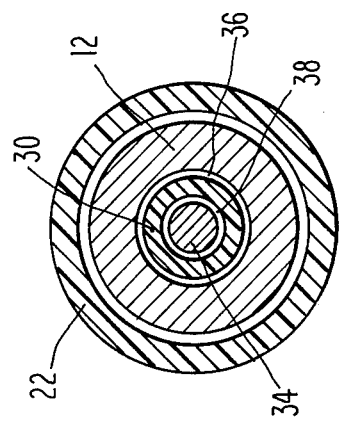

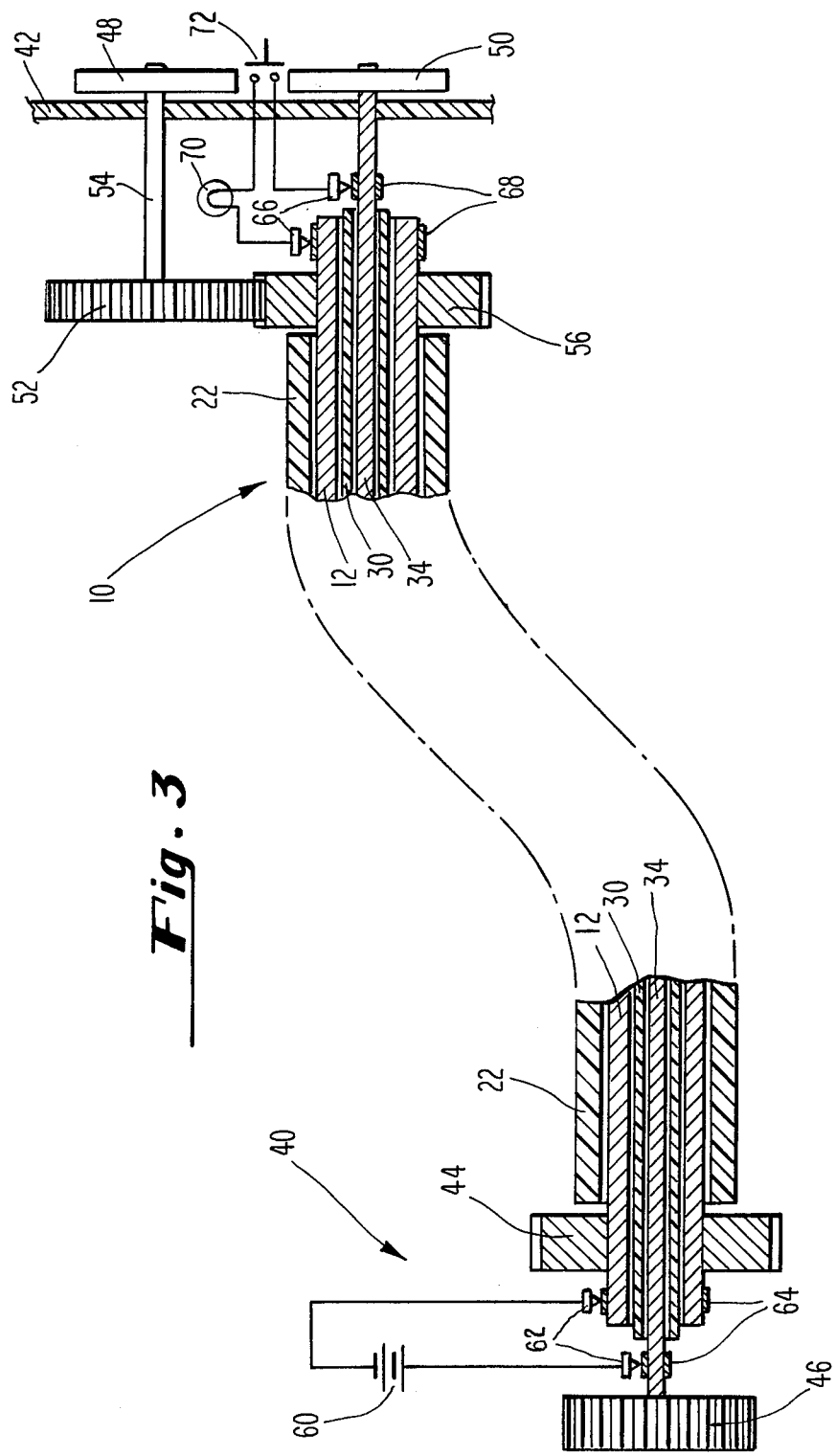

DUAL CONCENTRIC, ELECTRICALLY ISOLATED, MULTI-FUNCTION ROTATABLE FLEXIBLE SHAFT

STATEMENT OF THE INVENTION

This invention relates to flexible shafts characterized by a rotatable outer flexible shaft having a central hollow bore for containing an electrically insulating flexible tube which permits movement of an inner flexible shaft therewithin independently of the rotation of the outer flexible shaft. An electric current may be carried by the outer and inner shafts simultaneously with rotation or movement thereof.

BACKGROUND AND SUMMARY OF THE INVENTION

Flexible shafts comprise basic elements of power transmission and are designed to transmit rotary motion or control from a driving element to an element to be driven. Transmission may be over, under, or around obstacles or objects where transmission by solid shafts would be impractical or impossible.

In a typical rotatable flexible shaft, a central wire mandrel has a plurality of layers of closely coiled wire wound thereover, each of the layers being successively wound over another in alternately opposing directions, i.e., right or left-hand lay. This shaft may be covered by a flexible casing and a clearance between the shaft and casing is provided in order that the shaft may rotate freely within the casing.

Another type of rotatable flexible shaft does not include a wire mandrel but is provided with a central hollow bore for receiving a soft solid metal wire therewithin. The shaft and wire may then be curved to a desired configuration for routing around or between components. Such a hollow shaft is fabricated by winding the strands over a solid mandrel, heat treating the strands, and removing the mandrel.

The present rotatable flexible shaft may be used in power driven or remote control applications and employs such a hollow flexible shaft as an outer torque carrying member as well as an electrical current carrying member. An electrically insulating flexible tube is received within the hollow bore. Disposed within the hollow bore is an inner rotatable flexible shaft, capable of transmitting torque while rotating. The inner shaft may be impressed with an electrical polarity opposite to the outer hollow shaft, thus enabling a circuit to be completed through the shafts. The inner shaft may function as a push-pull element, as well as a rotatable element, while current is passing therethrough, and while the outer shaft is rotating. An outer protective casing may be provided.

A principal advantage derived from the practice of the present invention resides in a savings of space and weight, as well as components which would be needed if separate flexible shafts and electrical connections were required between driving and driven members.

BRIEF DESCRIPTION OF THE DRAWINGS

FIG. 1 is an exploded perspective view of the flexible shaft of the present invention.

FIG. 2 is a sectional view of the flexible shaft of FIG. 1, when assembled, through line 2—2 thereof.

FIG. 3 is a partially sectioned diagrammatic view illustrating a remote control application of the shaft of the present invention, with portions thereof shown schematically.

FIG. 4 is a fragmentary front elevation view of the device of FIG. 3.

DETAILED DESCRIPTION OF THE INVENTION

Figure 5:
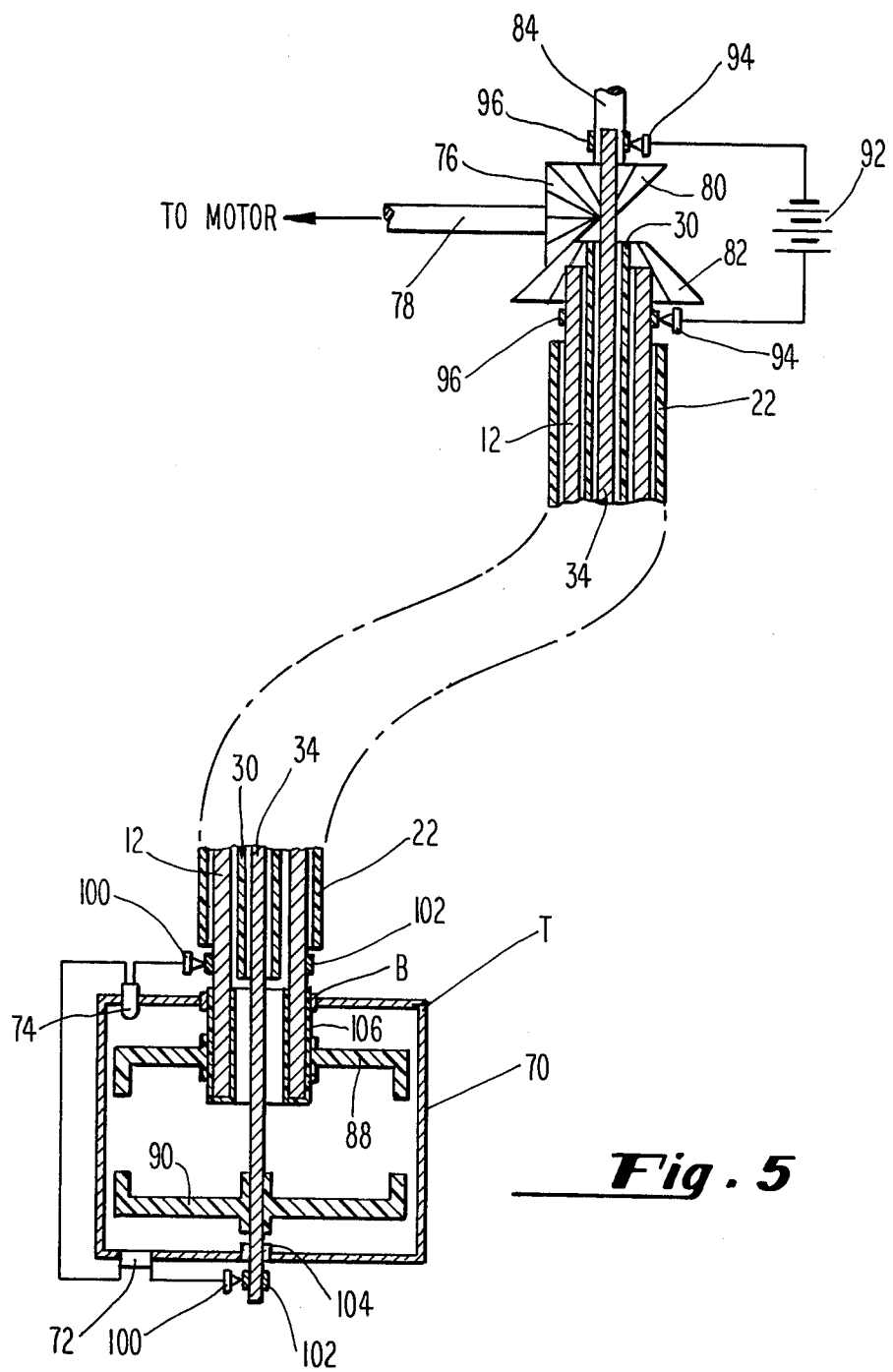
FIGS. 5 and 6 are partially sectioned diagrammatic views illustrating respectively a low rpm power driven application and push-pull application of the shaft of the present invention.

In FIGS. 1 and 2, the multi-function rotatable flexible shaft 10 of the present invention includes an outer flexible shaft 12 comprising a plurality of coils of closely wound wire. In the fabrication of shaft 12, referred to above, the first layer of wire 14 is wound over a mandrel (not shown) and additional layers 16 and 18, and more if desired, or less, are coiled successively, one upon another, in alternately opposing directions. After heat-treatment and removal of the mandrel, a resultant hollow core 20 is formed centrally of the shaft 12.

A flexible non-metallic casing 22 may optionally be provided around outer flexible shaft 12 to protect the flexible shaft 10 from dirt, corrosive elements, and bruises of various sorts, and electrical contact when the shaft 12 is conducting an electrical current. In order that outer shaft 12 may rotate freely within casing 22, a space or clearance 24 is provided therebetween.

An electrically insulating, high dielectric strength flexible tube 30, typically polytetrafluoroethylene or polyolefin, is received within core 20. Tube 30 is provided with a central core 32 for receiving an inner flexible shaft 34 comprising a fine wire mandrel and one or more layers of fine wire wound successively thereover, similarly to outer shaft 12. Clearances 36 and 38, typically 0.015 inch, are respectively provided between outer shaft 12 and flexible tube 30; and between inner shaft 34 and flexible tube 30.

In FIG. 3, flexible shaft 10 communicates between a remotely disposed radio 40 aboard an aircraft, for example, and a control panel 42 at the cockpit, while simultaneously transmitting an electric current from the radio to the control panel. Radio 40 may be provided with a coarse tuning control gear 44 and a fine tuning control gear 46 adjustable by knobs 48 and 50 respectively rotatably mounted to control panel 42. Rotation of knob 48 rotates spur gear 52 through shaft 54 and a cooperating spur gear 56 suitably secured around outer hollow flexible shaft 12, causing coarse radio tuning control gear 44 affixed thereto to rotate accordingly. Rotation of knob 50 rotates inner flexible shaft 34 to rotate fine tuning control gear 46. Control gears 44 and 46 cooperate with gear mechanisms (not shown) to effect the coarse and fine tuning respectively. Flexible tube 30 electrically insulates flexible shafts 12 and 34. Knobs 48 and 50, and spur gears 52 and 56 are made of a suitable electrically non-conducting material. Control panel 42 is preferably transparent or translucent for purposes of through-panel lighting.

Current is supplied to flexible shafts 12 and 34 by any suitable means, as by battery 60, for example, through brush blocks 62 contacting slip rings 64 secured to the flexible shafts. Similar brush blocks 66 and slip rings are provided at the other end, or control panel end, and a lamp 70, for example, is connected across the brush blocks 66 to illuminate the knobs 48 and 50, control panel 42, and the like. Switch 72 is provided to turn radio 40 and lamp 70 on or off.

It is appreciated that a principal advantage to be derived from practicing the present invention resides in the saving of space and weight as well as auxiliary components which would be required if conventional flexible shafts and a separate electric harness were employed. Of course, inner shaft 34 may readily be adapted for push-pull movement.

FIG. 5 illustrates a low rpm power driven application of the flexible shaft of the present invention wherein a small mixing tank 70 is provided with a typical dump valve 72 and a sensor 74. An electrically non-conducting miter gear 76 is secured to shaft 78, driven by a motor (not shown). Electrically non-conducting gears 80 and 82 articulate with miter gear 76. Inner flexible shaft 34, of sufficient diameter, is secured to gear 80 and metallic shaft 84, and extends through a central opening in gear 82, which central opening also receives flexible tube 30. Suitable clamping means (not shown) in which shaft 84 rotates, maintain gears 82 and 80 respectively in articulating relationship with gear 76 such that rotation of gear 76 causes outer hollow flexible shaft 12 to rotate in one direction and inner flexible shaft 34 to rotate in the other direction, causing molded rubber or plastic paddles or blades 88 and 90 respectively to rotate accordingly. Of course, both blades may rotate in the same direction obviating the need for miter gearing. Current is supplied to flexible shafts 34 and 12 by battery 92, for example, through brush blocks 94 and slip rings 96.

Sensor 74 and dump valve 72, typically solenoid-operated, are connected across brush blocks 100, one each mounted at a lower portion of shafts 12 and 34, which brush blocks 100 receive power from battery 92 through slip rings 102.

Conventional sealing means 104, suitably teflon, provides a liquid-tight seal with inner shaft 34. Outer shaft 12 rotates in suitable bearings B provided in a top member T of mixing tank 70.

Outer hollow flexible shaft 12 is provided with an electrically non-conducting coating or sleeve 106 at a lower portion to prevent short-circuiting of current through the mixture in tank 70.

Means for maintaining flexible shaft 10 along a circuitous or desired path may be accomplished by suitable support clamps (not shown) along casing 22.

In operation, the liquid and constituents to be mixed are introduced into mixing tank 70 conventionally through an opening in cover T (not shown) or by removal thereof. Blades 88 and 90 may be slowly rotating, or rotation may be started after all or a portion of the mix is introduced. Sensor 74 is triggered to activate dump valve 72 when a desired volume, pH, specific gravity, homogeneity, and the like, is attained.

Another typical use of the flexible shaft of the present invention resides in metering or proportioning applications wherein the inner and outer flexible shafts are driven by a common motor shaft but the outer shaft is rotated at a faster or slower speed than the inner by gear means interposed between the outer flexible shaft and motor shaft. The shafts may be connected to separate pumping means for metering liquids into a mixing tank and the sensor actuates controls when a desired volume, for example, is attained.

Figure 6:
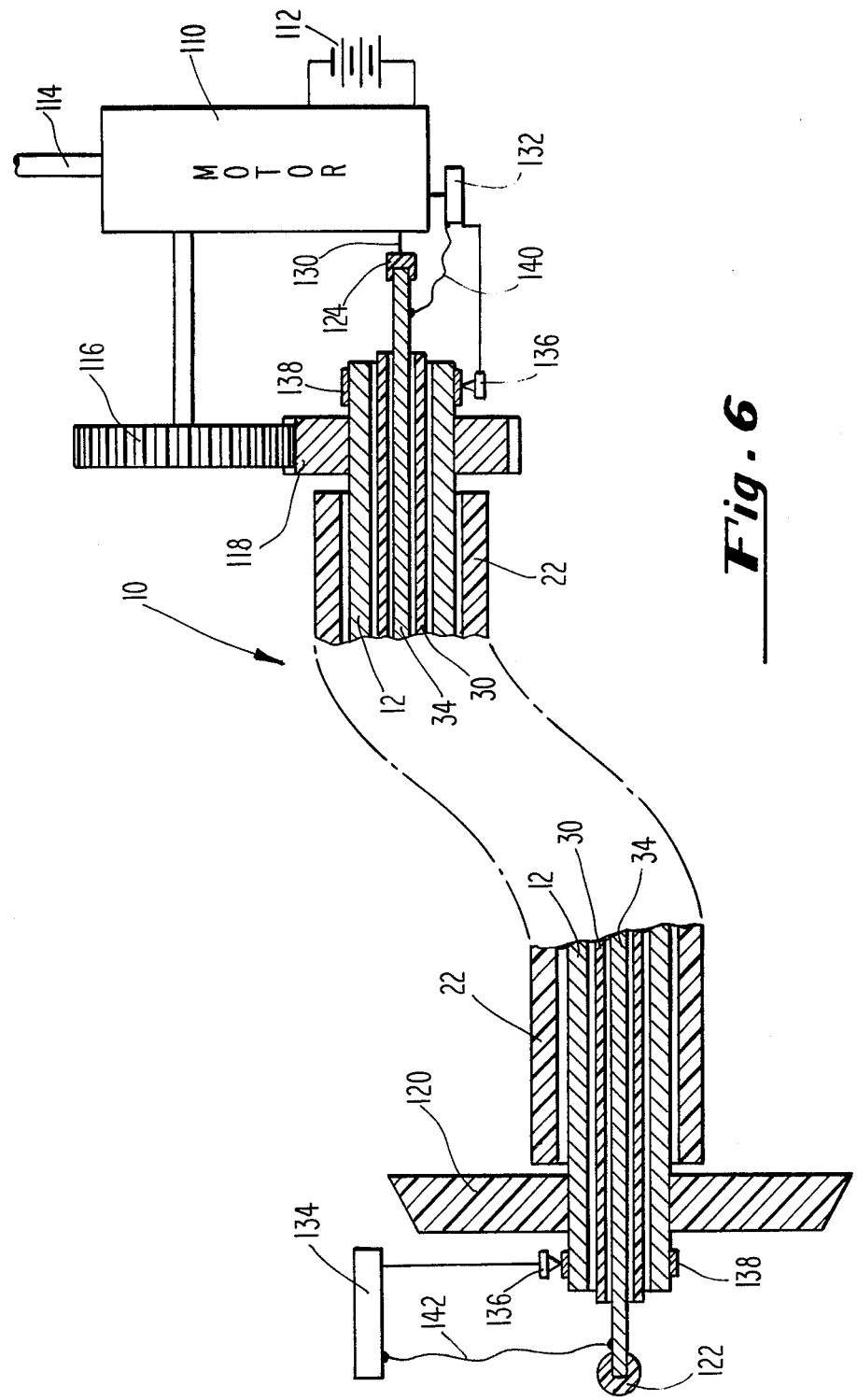

A typical push-pull application of the flexible shafting of the present invention is illustrated in FIG. 6 wherein a remotely disposed motor 110, powered by a battery 112, for example, has a variable speed output shaft 114 whose speed is controlled by gear throttle knob 116 which rotates in accordance with rotation of gear 118 secured around outer flexible shaft 12, controlled by throttle control knob 120. Inner flexible shaft 34 is provided at each end with an electrically insulating knob 122 and 124. Push-pull movement of inner flexible shaft 34 controls on-off switch 130 of motor 110. Suitable sensing means 132 associated with motor 110 detects the rpm of output shaft 114 and transmits signals to a digital tachometer 134, for example, by means of brush blocks 136 and slip rings 138 mounted to outer flexible shaft 12. Lead wires 140 and 142 are connected to sensor 132 and tachometer 134 respectively to complete the circuit.

It is apparent from the foregoing description that I have provided flexible shafting wherein an outer hollow flexible shaft is capable of transmitting rotary motion and another flexible shaft mounted in electrically insulating relationship thereto and concentrically therewithin is capable of transmitting rotary or push-pull motion simultaneously with rotation of the outer shaft, and means are additionally provided for transmitting an electric current through the shafts while each shaft is rotating independently of the other or at least while the outer shaft is rotating.

I claim:

1. Flexible shafting comprising
    an outer flexible shaft having a hollow core,
    a flexible tube disposed within said hollow core,
    an inner flexible shaft received within said flexible tube,
    wherein a clearance is provided between said flexible tube and each of said outer and inner flexible shafts,
    wherein one end of each of said outer and inner flexible shafts is connected to a separate rotating driving member, and
    other end of each of said outer and inner flexible shafts is connected to a separate driven member, and
    means for impressing an electric current across said outer and inner flexible shafts while rotating.

2. Flexible shafting of claim 1 wherein said outer and inner flexible shafts are simultaneously independently rotating in the same direction.

3. Flexible shafting of claim 1 wherein said outer and inner flexible shafts are simultaneously independently rotating in opposite directions.

4. Flexible shafting of claim 1 wherein one end of each of said outer and inner flexible shafts is driven by a single rotating driving member,
    other end of each of said outer and inner flexible shafts is connected to a separate driven member, and
    means for impressing an electric current across said outer and inner flexible shafts while rotating.

5. Flexible shafting of claim 4 wherein said outer and inner flexible shafts are simultaneously independently rotating in the same direction.

6. Flexible shafting of claim 4 wherein said outer and inner flexible shafts are simultaneously independently rotating in opposite directions.

7. Apparatus incorporating the flexible shafting of claim 1 wherein
    each end of said outer flexible shaft is respectively connected to a rotating driving and driven member, said driven member having an electric current supplied thereto,
    each end of said inner flexible shaft is respectively connected to a push-pull driving member and to said driven member, and means for transmitting said electric current from said driven member across said outer and inner flexible shaft while said outer flexible shaft is rotating.

8. Apparatus of claim 7 wherein said driven member is an electric motor having a variable speed output shaft.

9. Apparatus for mixing components in a mixing tank provided with a dump valve and sensor by a driving motor shaft, said apparatus comprising flexible shafting including an outer flexible shaft having a hollow core,
an electrically non-conducting flexible tube disposed within said hollow core,
an inner flexible shaft received within said flexible tube,
means cooperating with said motor shaft for rotating said inner and outer flexible shafts in opposite directions, each of said shafts having a paddle blade secured thereto for rotation therewith in said mixing tank,
means for impressing an electric current across said shafts while rotating, and
other means for transmitting said current from said inner and outer flexible shafts to said sensor and dump valve whereby said dump valve empties said mixed components from said mixing tank in response to a signal from said sensor.

* * * * *